Fig. 2.

(No Model.) 8 Sheets—Sheet 4.

H. A. WEBSTER.
HEEL ATTACHING MACHINE.

No. 505,074. Patented Sept. 12, 1893.

WITNESSES:
Norton Folsom
Geo. C. Dent

INVENTOR:
Harold A. Webster
by his Attorneys
Brown Bros.

(No Model.) 8 Sheets—Sheet 5.

H. A. WEBSTER.
HEEL ATTACHING MACHINE.

No. 505,074. Patented Sept. 12, 1893.

WITNESSES:
Norton Folsom
Geo. C. Bent

INVENTOR:
Harold A. Webster
by his Attorneys
Brown Bros.

(No Model.)

H. A. WEBSTER.
HEEL ATTACHING MACHINE.

No. 505,074. Patented Sept. 12, 1893.

WITNESSES:
Norton Folsom.
Geo. S. Beal

INVENTOR:
Harold A. Webster
by his Attorneys
Brown Bros.

(No Model.)  H. A. WEBSTER.  8 Sheets—Sheet 7.
HEEL ATTACHING MACHINE.

No. 505,074. Patented Sept. 12, 1893.

Witnesses:
Nathan Folsom
Geo. E. Dent

Inventor:
Harold A. Webster
by his Attorneys
Brown Bros.

(No Model.) 8 Sheets—Sheet 8.

H. A. WEBSTER.
HEEL ATTACHING MACHINE.

No. 505,074. Patented Sept. 12, 1893.

WITNESSES:
Norton Folsom
Geo. O. G. Dent

INVENTOR:
Harold A. Webster
by his Attorneys
Brown Bros.

UNITED STATES PATENT OFFICE.

HAROLD A. WEBSTER, OF HAVERHILL, MASSACHUSETTS.

HEEL-ATTACHING MACHINE.

SPECIFICATION forming part of Letters Patent No. 505,074, dated September 12, 1893.

Application filed February 18, 1888. Serial No. 264,538. (No model.)

*To all whom it may concern:*

Be it known that I, HAROLD A. WEBSTER, of the city of Haverhill, in the county of Essex and State of Massachusetts, have invented certain new and useful Improvements in Machines for Attaching Boot or Shoe Heels, of which the following is a full, clear, and exact description.

This invention relates to a machine for attaching heels to boots or shoes. This machine is more especially designed for use in carrying out the improved method of attaching heels to boots or shoes which I have invented and which forms the subject of a separate application, Serial No. 256,061, filed November 25, 1887.

The invention consists in a certain combination of devices hereinafter described and claimed, whereby a heel previously charged with nails may be supported while a top lift is forced onto the projecting heads of said nails, the devices for supporting the points of said nails being formed to bend or incline the points of the nails outwardly or radially to enable them to act as described in the above named application in preventing the displacement of the heel while it is being attached to the boot or shoe, and in finally attaching the heel to the heel seat or sole.

The invention also consists in certain other improvements relating to an organized machine for attaching heels, all of which I will now proceed to describe.

In the drawings, forming part of this specification, is illustrated the machine of this invention. Figs. 6, 7, 8 and 9 are detail views hereinafter referred to. Figs. 11, 12 and 13 are detail views hereinafter referred to.

Figure 12:
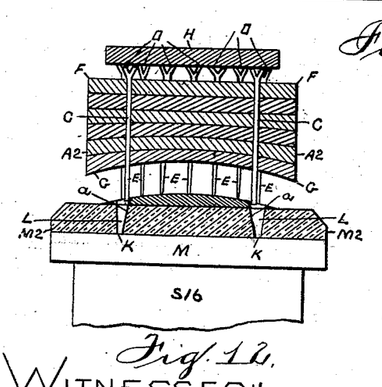
Figure 13:
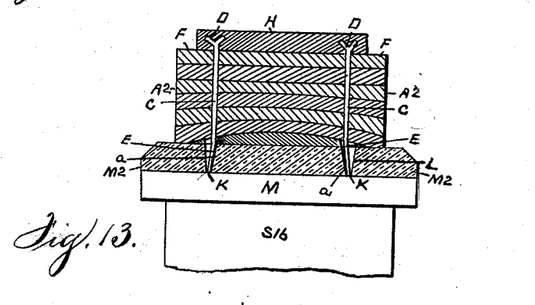
Figure 14:
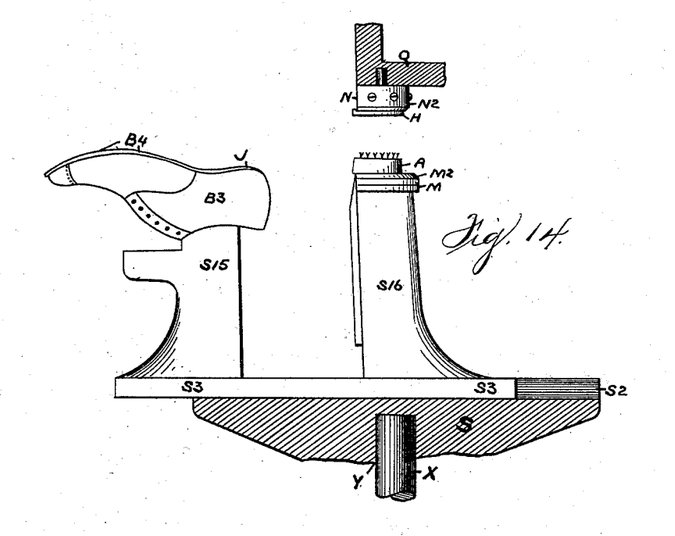
Figs. 14, 15, 16 and 17 are substantially elevations of the parts of the machine directly working to attach the nails to the heel and the heel to the boot or shoe sole, and they are shown in their different positions, stripped of their operating mechanisms and other appurtenances but provided with the heel, and its top-lift and boot and shoe, all as will hereinafter fully appear.
Figure 15:
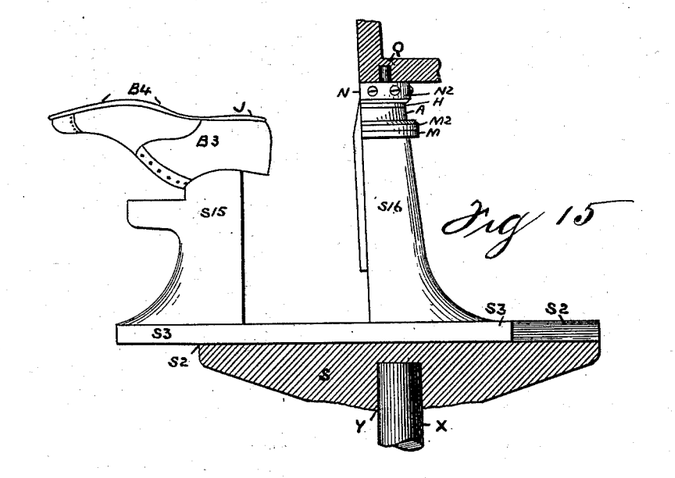
Figure 16:
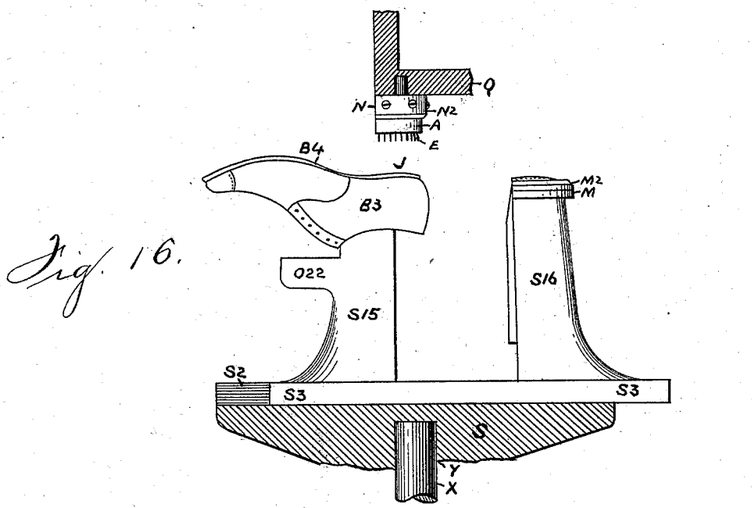
Figure 17:
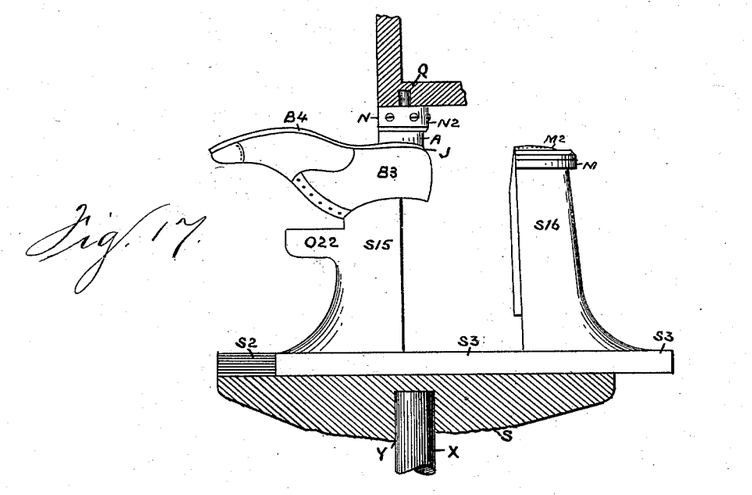

In the drawings, Figs. 12 and 13, the heel-blank made of leather lifts or taps at suitable points is pierced or pricked as it is termed with straight holes all as usual and well known for the attachment of heels with nails, as a means of fastening to boot or shoe soles. The nails preferably should tightly or closely fit the awl holes. The nails, particularly shown, at one end E are pointed and at their opposite ends D they are split and bent outwardly into the shape of a V.

H is the top-lift or tap to finish the face F of the heel and in Figs. 6, 14, 15, 16 and 17, J is the heel end of the boot or shoe sole, at which the heel is to be attached with its face G, Figs. 12 and 13, to lie against the outer face of said heel end J of sole. The top-lift H and heel are spanked one upon the other and are thus attached by pressing and forcing the projecting nail-heads D of the heel into the top-lift H and the heel with a top-lift attached as stated is attached to the heel-end J of the sole by pressing and forcing the sole over and upon and clinching the bent projecting nail-points E against the inner side or otherwise in relation to the thickness of the boot or shoe sole.

To spank and attach fastenings, such as nails and a top-lift and through the top-lift a heel, or to spank and attach such fastenings and a solid heel, (not shown) and then to spank and attach a heel, with fastenings attached to it and projecting from one of its faces and to bend said projecting ends, a machine, constituting the subject matter of this invention, is by preference used, and will now be described.

P and P are two parallel uprights or standards, joined at top and bottom, by cross braces Q, R, and all making the main supporting frame of the machine.

S is a horizontal bed or platen having side extensions or arms T, which are attached by set-screws U, or otherwise, to vertical and parallel guide-rods V, each arranged to move vertically through stationary upper and lower horizontal ear-pieces W, W, on the inner faces of each upright P.

X is a rest or standard, entered into and projecting downward from a socket Y, at the center and under-side of the platen S and fastened by a set screw Z in said socket. The lower portion of post X is received in the socket of the upper arm $A^4$ of a vertical located knuckle-jointed piece $A^4$ and $A^5$, the lower arm $A^5$ of which, constructed as hereinafter explained to be lengthened and shortened at pleasure, constitutes one and the upper lever-arm of a vertical toggle-lever $A^5$, $A^6$ and is jointed at its lower end to the upper end of the other and lower arm $A^6$ of said toggle-lever, and this arm $A^6$ is attached to the lower cross-brace R of the uprights P, P, arranged at its end-portions to turn in suitable bearings of said uprights.

$B^2$ is a treadle-lever making a part of the lower arm $A^6$ of the toggle-lever $A^5$, $A^6$ and through which to work the toggle-lever and thereby to raise the platen or bed S, and the parts of the machine carried by it, as hereinafter explained. The upper toggle-lever $A^5$ is in two separate parts, joined end to end, by a screw-threaded rod $A^7$, having right and left screw-threaded end portions, which are screwed into corresponding screw-threaded sockets of the opposite separate parts of said toggle-lever $A^5$, $A^6$.

$A^8$ is a wheel-handle, having a milled edge, of screw-rod $A^7$ for convenience in turning said rod, and according to the direction in which the rod $A^7$ is turned, thereby to lengthen and shorten the length of toggle-lever $A^5$, $A^6$, or in other words, to lengthen or shorten the vertical distance between the opposite end-axes or fulcra, $A^9$ and $A^{10}$ of said connection of said toggle-lever $A^5$, $A^6$, with the platen S and the lower toggle-lever $A^6$ and also the normal height of the platen and the length of its vertical movement, under the throw of the toggle-lever, all and for a purpose as will hereinafter more fully appear.

$S^2$ is a horizontal dovetail guide-way on the upper side of platen S and extending across it from front to rear.

$S^3$ is a slide or carriage, located in said way $S^2$ and to be moved forward and backward therein.

$S^4$ is a weight suspended from a belt $S^5$ which is secured to the rear end of the carriage $S^3$ and passes over a guide-pulley $S^6$, turning in a suitable bracket-support $S^7$ attached to and at the rear of the uprights P. P. This weight $S^4$, when the slide-carriage is set free to its action, operates to move the carriage over the platen, from the front to the rear of the machine and the carriage is returned by moving it, with the hand, against said weight.

$S^8$, $S^9$ are two stop-buttons located on the platen S, at and along one side and at different points in the length of its carriage $S^3$, and $S^{10}$ is a spring-pawl fulcrumed on the front end of the carriage and in position for an abutment with each of said stop-buttons $S^8$, $S^9$ and thereby to hold the carriage against movement along its way $S^2$ of the platen S, under the action of the weight $S^4$, as described.

The pawl $S^{10}$ has a handle $S^{11}$, for convenience of releasing it from its abutment against the stop-buttons $S^8$, $S^9$ and the spring $S^{12}$ of the pawl secures, when the pawl is released to its action, the automatic placing of the pawl in position to abut against a stop-button $S^8$, $S^9$. Each stop-button $S^8$, $S^9$ has screw-threaded shank $S^{13}$ screwing into separate suitable screw-threaded sockets $S^{14}$ of the platen S, all so that the buttons can be adjusted separately and as to the distance between their respective abutment faces for the spring-pawl $S^{10}$, and for a purpose as will hereinafter appear.

The carriage $S^3$ has two fixed posts or standards $S^{15}$, $S^{16}$, at its opposite end-portions. The rear post $S^{16}$ at its upper end, has an anvil or block M, which is constructed to receive a boot or shoe heel, charged with nails and to make a seat for the projecting points of the nails and otherwise as hereinafter described. The front post $S^{15}$, at its upper portion, is constructed as a jack or last O, to receive and support a boot or shoe with the treading face of its sole uppermost, and otherwise as will hereinafter appear.

The heel receiving anvil or block M is of the general outline of a boot or shoe heel and it and its post $S^{16}$ are located on the carriage $S^3$ so that, when the spring-pawl $S^{10}$ of the carriage is in abutment against the front stop-button $S^8$ of the platen (said button being properly adjusted therefor) the center of said block will be practically coincident with the vertical central line of the up and down movement of the platen under the operation of the toggle-lever $A^5$, $A^6$, as described. Again, the boot and shoe jack or last O and its post $S^{15}$ are located on the carriage $S^3$ so that, when the spring-pawl $S^{10}$ of the slide is in abutment against the rear stop-button $S^9$ of the platen—(said button being properly adjusted therefor) the center of the heel-end J of the sole of the boot or shoe placed and secured thereon will be practically coincident with the vertical center line of the up and down movement of the platen under the operation of the toggle-lever $A^5$, $A^6$ as described and also so that the heel-end J of the boot or shoe sole, will then occupy a position as to all portions thereof, substantially corresponding to that of the same portions of the heel-block or anvil M and of the heel thereon, when the center of said anvil M and heel thereon are coincident with the central vertical line of the up and down movement of the platen as has been described.

The working face of the heel anvil or block M is formed of a plate $M^2$, preferably detachably attached to the block M. This heel-plate $M^2$ has a series of vertical holes or cavities L which is located correspondingly to the location of the nails which are inserted in the holes of the heel A to be operated upon in the machine. The axes of these holes are slightly outside of the axes of the nail-holes of the heel-blank, and the depth of each hole is equal substantially to the length, which the nails, at their points, are to project from the face of the heel to which heel they are fastened either directly or indirectly through a top-lift H, Fig. 13. The wall $a$ of each hole of the heel plate $M^2$, and which wall is toward the center of the heel-plate, inclines from the top to the bottom of the hole and toward the edge of the plate and each hole at its bottom which is rigid, is of a diameter substantially equal to that of the nails at their points, and the holes are severally located at one side of the axes of the nail-shanks within the heel and toward the edge of the heel-plate. This inclination and bend of the inner wall $a$ of the holes L in the heel-plate, as will hereinafter appear operates to bend the portions of the nails which project from the face G of the heel, toward the edge of the heel.

Figure 7:
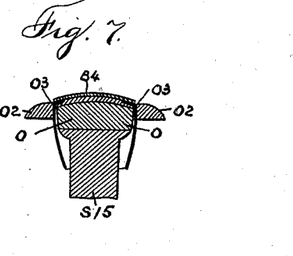
Figure 8:
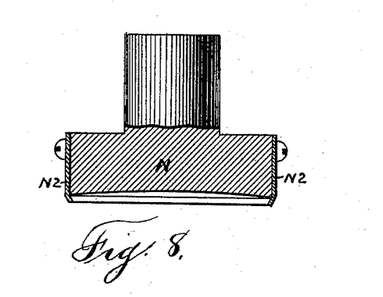
Figure 9:
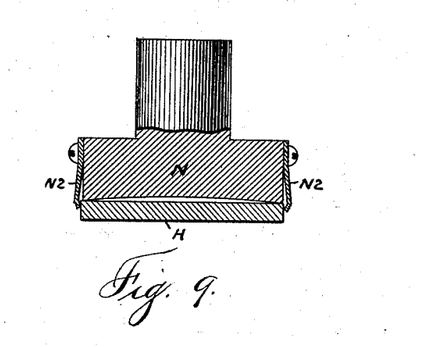
Figure 10:
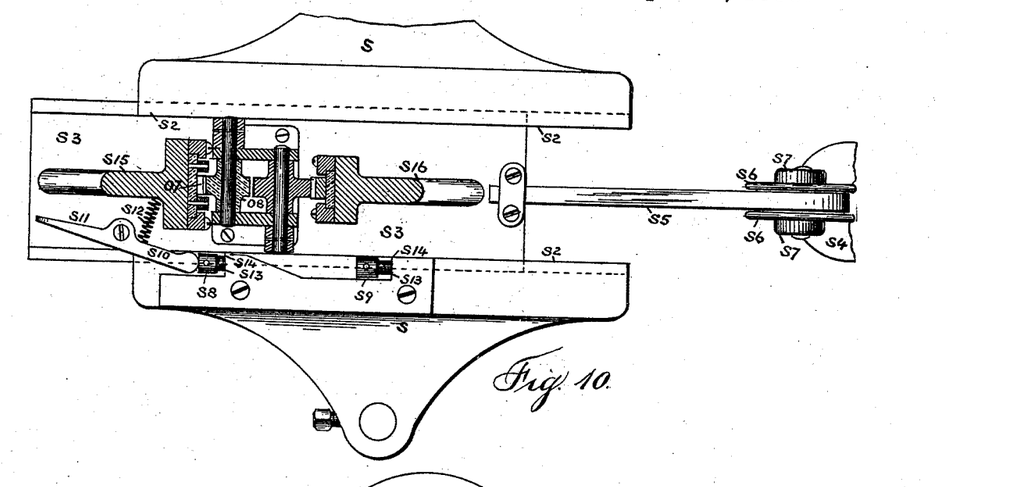
Fig. 10 is a horizontal section, on line 10—10, Figs. 2 and 3.
Figure 11:
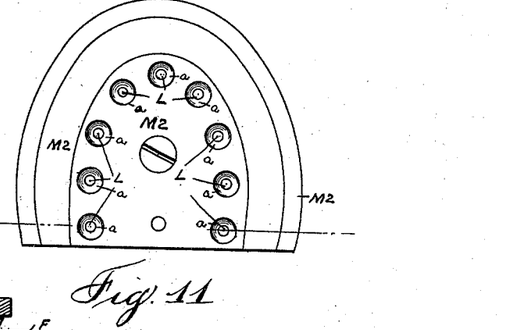

$O^2$, $O^2$, are two clamps, to clamp the upper of the boot or shoe $B^3$, placed on the last O, at and about and on opposite sides of the heel-end J of its sole $B^4$. The clamping face $O^3$, Fig. 7, of each clamp corresponds substantially to the shape of the upper of the boot or shoe at and along the side and partially around and toward the rear part of the heel. The clamps are carried by separate vertical arms $O^4$, $O^4$, separately fulcrumed, at their lower ends, upon a vertically movable slide-plate $O^5$, located and moving in a suitable vertical guide-way $O^6$ at the rear side and lower portion of the front post or last-stand $S^{15}$ of the carriage $S^3$. This slide-plate $O^5$ has a vertical toothed rack $O^7$ meshed by a pinion gear-wheel $O^8$, which is supported and turns in suitable bearings of the horizontal carriage $S^3$ and $O^9$ is an operating handle for said pinion. Rotating the pinion-gear-wheel $O^8$, in opposite directions, raises or lowers, as the case may be, the vertical slide-plate $O^5$ and through it the clamps $O^2$.

$O^{12}$, $O^{12}$, are vertical slots of similar cam or obtuse angular shape, from end to end, one slot in each arm $O^4$, carrying a clamp $O^2$.

$O^{13}$, $O^{13}$, are anti-friction rolls each engaging a cam-slot $O^{12}$, and carried by and confined endwise on separate horizontal studs $O^{14}$, which pass through separate horizontal elongated or slotted openings $O^{15}$ of the last-stand $S^{15}$ and have flat sided heads $O^{16}$, located in a common horizontal way $O^{17}$ of the last-stand.

$O^{18}$ is a horizontal screw-rod, having at its opposite end-portions, right and left screw-threads, respectively screwing through the said stud-heads $O^{16}$, and all so that turning said screw-rod the axes of the anti-friction rolls $O^{13}$ can be made to approach or to recede from each other.

The clamp carrying arms $O^4$ in their up and down movement from the up and down movement of the vertical slide $O^5$ operated by rotation of the pinion-wheel $O^8$, move by their cam-ways $O^6$ over the anti-friction rolls $O^{13}$ entered in them and said shape and the location of said cam-ways are such, as, on the upward movement of the arm $O^4$ to secure a movement laterally of them and of their clamps $O^2$ toward each other and thus against and into close contact with the upper of the boot or shoe on the last O and on the downward movement of the arms to secure a movement laterally of them and of their clamps away from each other and thus place the clamps out of contact with the upper of the boot or shoe on the last. Again, said cam-ways are such as to allow the clamps after they have been closed tightly against and upon the upper of the boot or shoe on the last, to be free to continue to move downward upon the boot or shoe on a then continued downward movement of the vertical slide-plate $O^5$. The horizontal adjustment, by the screw-rod $O^{18}$ of the distance between the axes of the anti-friction rolls $O^{13}$ as described, enables the lateral movement of the clamps $O^2$ toward and away from each other as has been described, to be made greater or less, using the same cam-slotted clamp-carrying arms $O^4$.

Clamps $O^2$ constructed to embrace the upper of the boot or shoe on the last O and to be closed upon the upper all as above described, operate to draw the boot or shoe closely onto and to center the heel portion of the sole, at and on the heel of the last and also to firmly hold the boot or shoe as so centered to the last for having a heel attached to it, in the operation of this machine as will hereinafter appear.

$O^{19}$, $O^{19}$, are two upright arms each attached by set-screws $O^{21}$ to a horizontal shelf projection $O^{22}$ of the front post $S^{15}$ of the carriage $S^3$. These arms $O^{19}$ extend upward at the opposite side of the toe-portions of the last O and are to be adjusted, by loosening their set-screws and swinging them thereon and then setting up said screws to serve as guides to determine the position of the boot or shoe at its toe-portion on the last O and so adjusted to hold the boot or shoe against lateral movement at its toe-portion.

N is a block or anvil of the general outline of a boot or shoe heel and preferably detachably attached to the under side of the upper cross-brace Q of the frame-work of the machine, and with its center in a vertical plane coincident with that of the center of the heel-block $r$ or anvil M secured to the carriage $S^3$ when said anvil M is in a position coincident with the vertical central line of the up and down movement of the platen S, as has been described.

$N^2$ is a flange secured about the circular edge of and projecting below the under face of the anvil N. This flange $N^2$ is made of spring-metal so as to close upon and to grasp the edge of a top-lift for a heel, or of a heel-blank placed within it and upon the anvil and thereby to hold said top-lift or heel against accidental escape from the block.

The machine herein described, before being used for attaching the heels to boots or shoes, is first provided with a last O suitable for the boots or shoes, which are to be heeled in it and also with anvils or blocks M, N, suitable to the sizes of the heels and the number and location of the fastening nails to be used in the heels and otherwise the several parts of the machine are adjusted so as, on the forward and backward movement of the carriage S³ to secure the proper and described coincident relation of the heel-block or anvil M and of the heel-end of the boot or shoe on the last O with the center of the upper stationary anvil or block N and also so as to secure the desired upward movement of the heel-block or anvil M and last O toward the upper anvil or block N under the operation of the toggle-lever by depressing the treadle B².

The machine prepared and adjusted as above stated is used and operated to attach heels to boots or shoes, as follows:—Take a heel to have a top-lift H attached to it, and having pricked it and charged its holes with nails, projecting the heads and points of the nails from the opposite faces F, G of the heel,—(preferably evening up the nails at their heads,)—and place the heel upon the heel-anvil or block M, entering the projecting points of its nails slightly into the holes of said block; also place the top-lift H to be attached to the heel against the upper stationary anvil or block N and within its surrounding spring-flange N² and also place the boot or shoe to which the heel A is to be attached, on the last O and secure and center it thereon, by closing the heel-clamps O² against its upper, at and about the heel-end of the sole, and properly set the toe-guides or holders O¹⁹ at each side of the boot or shoe, all as has been described. Then having brought the heel anvil or block M holding the nail charged heel as stated, in position under the anvil or block N holding the top-lift H as explained press down on the treadle B² and through toggle-lever connection raise said nail charged and held heel toward said top-lift and bring the projecting heads of the nails against the under face of the top-lift, on which, continuing to raise the heel, the nails at their points are forced downward into the holes L of the heel-anvil or block M, passing as so forced, over the inner inclined walls a thereof which work to bend the nail points outward from the center and toward the edge of the heel, and finally coming to a rest against the rigid bottom faces K of said holes. Continue the raising of the heel as stated, and as the points of the nails are resting on the bottom faces of the holes, the heads of the nails are thus pressed and forced into and thereby embedded and engaged with the top-lift then between the two anvils or blocks, resulting in an attachment of the nails to the top-lift and of the top-lift to the heel and in the preparation of the heel with nails for attachment with the projecting points of the nails to the sole of the boot or shoe placed and secured on the last O, as stated. Release the treadle B², on which, the heel anvil or block M from its own weight and that of its connecting parts described returns to its normal position leaving the heel A with its attached top-lift H on and against the upper anvil or block N where it is held by the spring-flange N² surrounding said block. The shape of the holes L is such that the upset or bent ends of the nails may readily leave said holes as the heel rises, as will be readily understood by referring to Fig. 13. Release the carriage S³ to movement by the operation of its weight S⁴, which brings the last O, containing the boot or shoe into position under the nail charged heel depending from the upper anvil or block N as stated, and then raise said last with the boot or shoe thereon, by depressing the treadle, toward said depending heel, and thereby bring the heel-end J of the boot or shoe sole against and press and force it over and upon the projecting points of the nails a' so that, with sufficient pressure, to enter the nails into and through the sole and to bend and clinch them thereon, (the direction of this clinch being toward the outer edge of the sole and heel because of their previous outward bend as described)—and to attach the heel to the sole securing a close and tight joint between the two.

Nails can be attached to a solid heel and the heel attached to the boot or shoe, in the machine explained in substantially the way described for a heel and top-lift, first having charged the heel with the nails by entering them at their head ends into the holes of the heel pricked partially through the heel and of a suitable size to receive them.

Lengthening and shortening the throw of the toggle-lever, as has been described regulates the depth to which the nail-heads are embedded in the top-lift or in the solid heel relative to the wearing or treading face of the heel.

Figure 1:
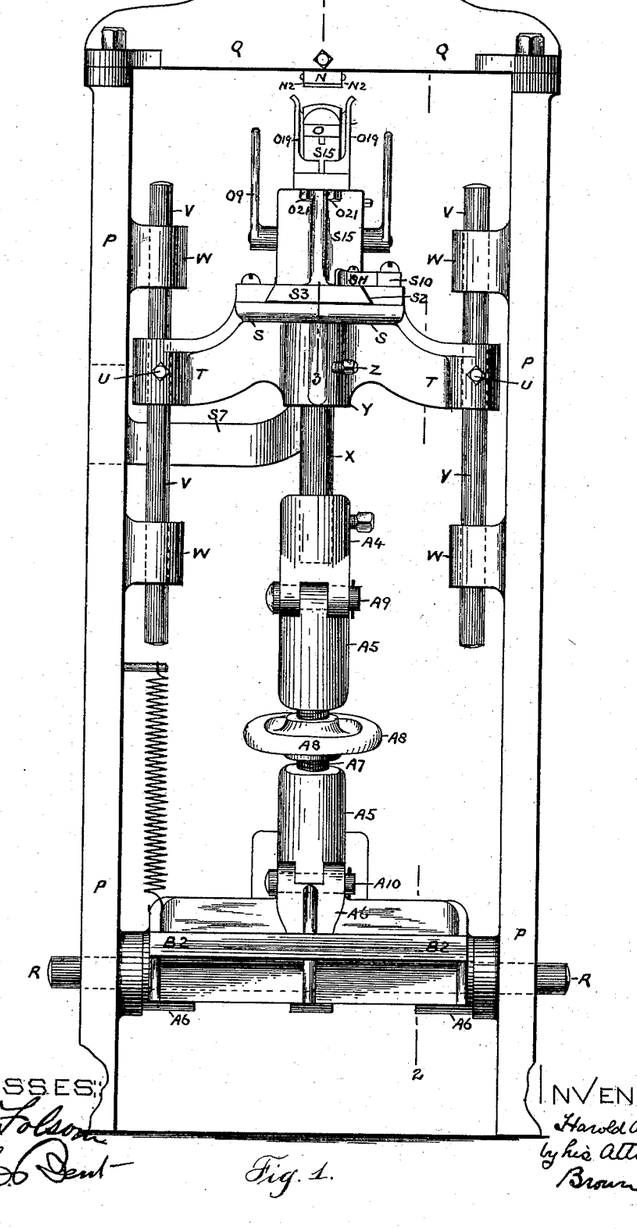
Figure 1 is a front elevation of the machine of this invention.
Figure 2:
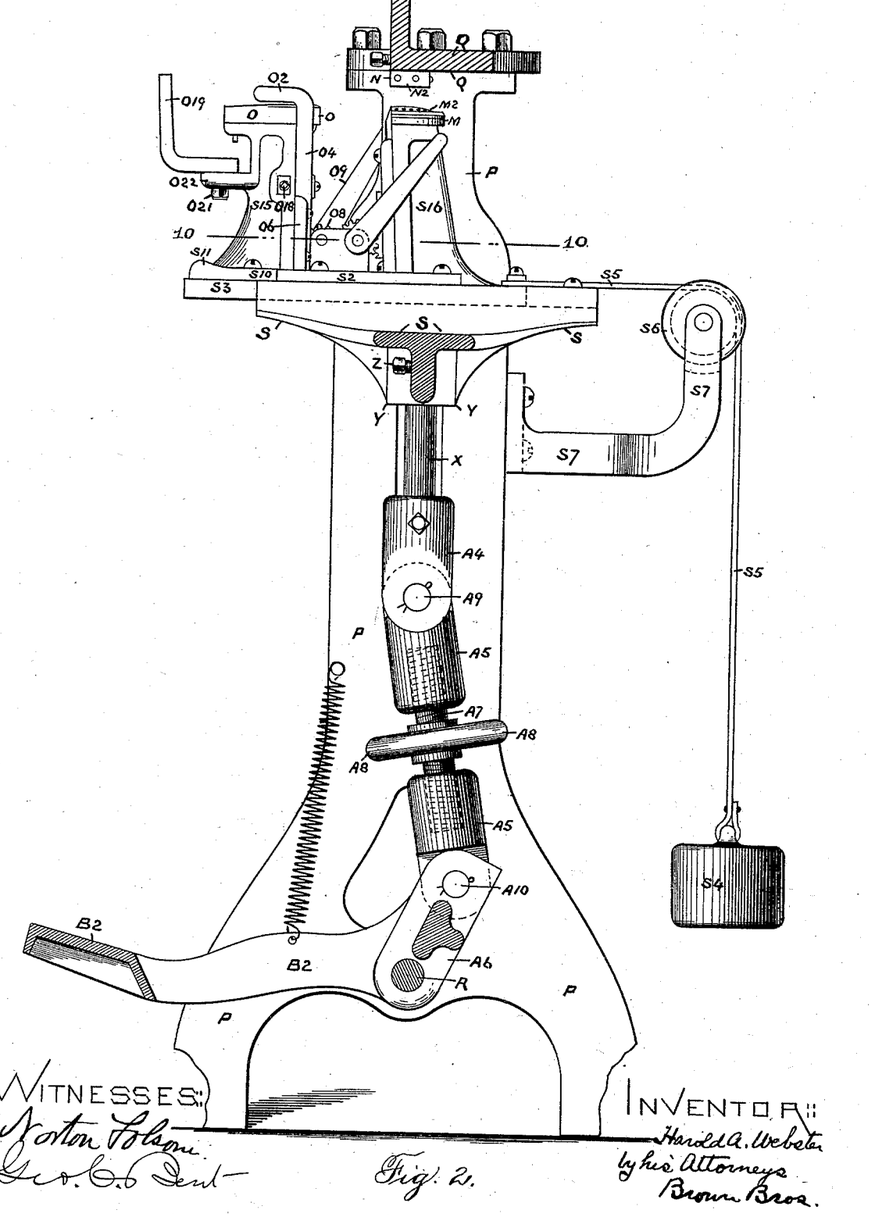
Fig. 2 is a vertical section, from front to rear, on line 2—2, Fig. 1.
Figure 3:
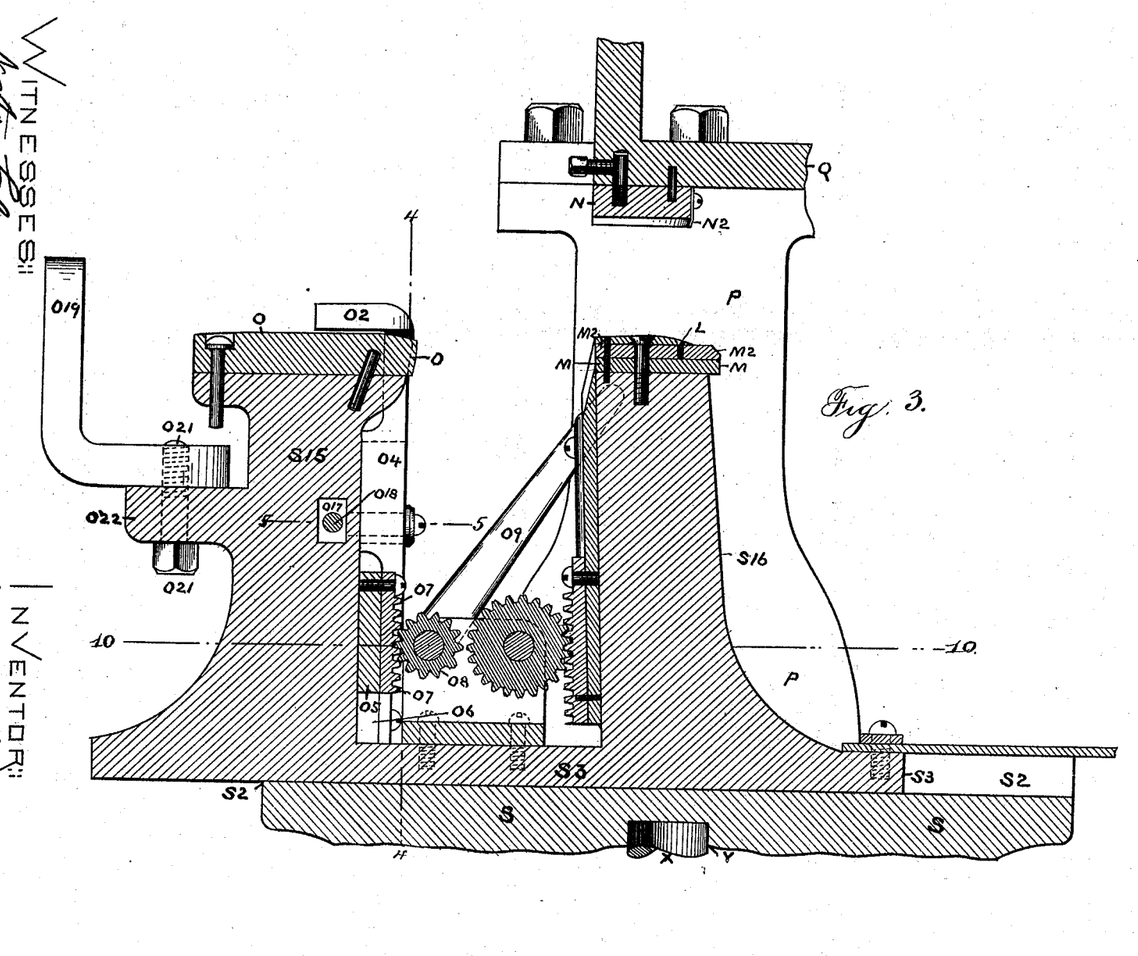
Fig. 3 is a vertical section, in detail and enlarged, on line 3—3, Fig. 1.
Figure 4:
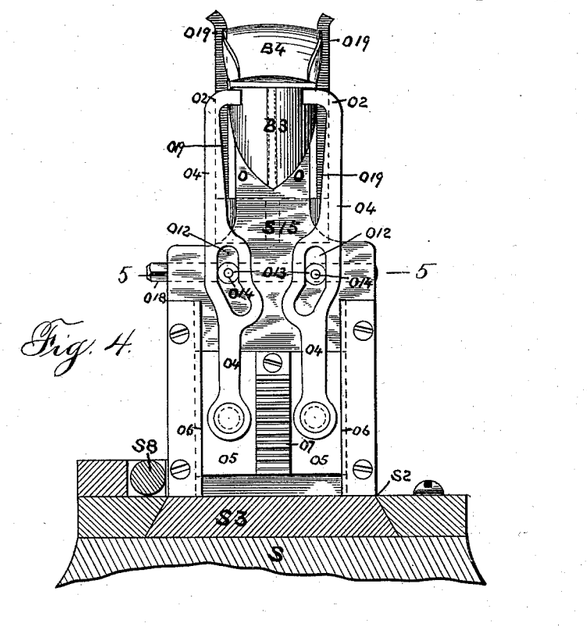
Fig. 4 is a vertical section, in detail and enlarged, on line 4—4, Fig. 3.
Figure 5:
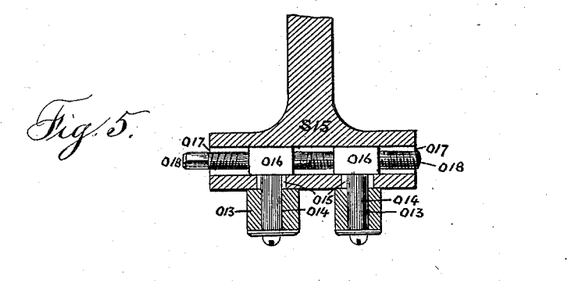
Fig. 5 is a horizontal section, on line 5—5, Figs. 3 and 4.
Figure 6:
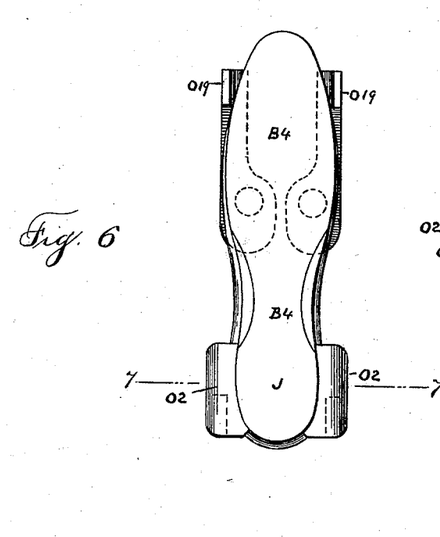

In Figs. 1, 2 and 3, (Fig. 3 more particularly)—devices are shown for breasting the heel when under pressure between the heel and top-lift anvils M, N. These devices constitute no part of this invention, and as they are to form the subject of separate application, to be hereafter made, for Letters Patent of the United States, it is not deemed necessary to herein particularly describe them and all rights to protect these devices by separate Letters Patent are hereby reserved.

The last O preferably is constructed to be detachably attached to its stand or post S¹⁵.

In another application filed by me September 23, 1889, Serial No. 324,769, I have shown and claimed certain features relating to an organized heel attaching machine which resemble certain features shown in this case. I do not therefore in this application claim anything shown and claimed in said application, Serial No. 324,769.

Having thus described my invention, what I claim, and desire to secure by Letters Patent of the United States, is—

1. In a machine for attaching nails to a boot or shoe heel, preparatory to attaching the heel by its said attached nails to a boot or shoe sole, the combination of two anvil-blocks M, N, having opposed faces adapted to support the opposite faces of a heel, one of said blocks having holes L which are open at the heel face of said block, rigid or closed at their bottoms or ends within the block, and provided with inclined surfaces formed to give an outward or radial inclination to the points of the nails, one of said blocks being movable toward and from the other, and means for applying power to said movable block to produce pressure on a heel placed between the blocks and on opposite ends of the nails in and projected from the heel, whereby the heads of the nails are embedded in a top lift interposed between the heel and the block M, and the points of the nails are first bent or inclined outwardly by the inclined surfaces of the holes L, and then supported by the bottoms of the said holes against the pressure of the top lift against the heads, as set forth.

2. In a machine for attaching heels to boots and shoes with nails or such like fastenings, in combination, an anvil or block M, having a face for the rest of a heel, and holes L open at said face and rigid or closed at their bottoms or ends within the block, to receive and make a rest for the ends of fastenings within and projected from a heel, an anvil or block N having a face for the rest of a heel and opposed to the face of the block M, a last or jack O to receive and support a boot or shoe, a slide-carriage $S^3$ carrying, at its opposite end-portions, the block M and the jack O, a support and guide-way on which to reciprocate said carriage $S^3$ to place either said block or the jack into and out of position for pressure to be produced upon the heel between the opposed faces of the blocks M, N, or between that of the block N and the jack, means for placing said opposed faces nearer to or farther from each other and thereby to secure and to release said pressure, abutments $S^8$, $S^9$ at opposite end-portions of said guide-way and an abutment $S^{10}$ on carriage to engage and be released from abutments $S^8$, $S^9$, substantially as described, for the purposes specified.

In testimony whereof I have hereunto set my hand in the presence of two subscribing witnesses.

HAROLD A. WEBSTER.

Witnesses:
ALBERT W. BROWN,
GEO. C. BENT.